(12) United States Patent
Holm (10) Patent No.: US 8,779,895 B2
(45) Date of Patent: Jul. 15, 2014

(54) ULTRASOUND ZONE LOCATION SYSTEM WITH HIGH CAPACITY

(75) Inventor: Sverre Holm, Asker (NO)

(73) Assignee: Universitetet I Oslo, Oslo (NO)

( * ) Notice: Subject to any disclaimer, the term of this patent is extended or adjusted under 35 U.S.C. 154(b) by 511 days.

(21) Appl. No.: 12/742,619

(22) PCT Filed: Nov. 12, 2008

(86) PCT No.: PCT/EP2008/065386
§ 371 (c)(1),
(2), (4) Date: Aug. 20, 2010

(87) PCT Pub. No.: WO2009/062956
PCT Pub. Date: May 22, 2009

(65) Prior Publication Data
US 2011/0018687 A1    Jan. 27, 2011

(30) Foreign Application Priority Data

Nov. 13, 2007  (EP) .................................... 07120535
Jul. 3, 2008    (EP) .................................... 08159582

(51) Int. Cl.
*H04Q 5/22*    (2006.01)
*G01S 11/14*   (2006.01)

(52) U.S. Cl.
CPC ..................................... *G01S 11/14* (2013.01)
USPC ....... 340/10.1; 340/5.61; 340/8.1; 340/539.1; 340/539.3; 340/539.11; 340/539.12; 340/539.13; 340/539.22; 340/539.26

(58) Field of Classification Search
USPC ................ 340/5.61, 8.1, 10.1, 539.1, 539.22, 340/539.26
See application file for complete search history.

(56) References Cited

U.S. PATENT DOCUMENTS 4,822,990 A * 4/1989 Tamada et al. ................ 235/492
5,051,741 A * 9/1991 Wesby ............................ 340/8.1

(Continued)

FOREIGN PATENT DOCUMENTS

EP  1 248 118 A2  3/2002
GB  2 295 257 A   5/1996

(Continued)

OTHER PUBLICATIONS

Scussel, Kenneth F. et al., "A New MFSK Acoustic Modem for Operation in Adverse Underwater Channels" 1997, pp. 247-254.

(Continued)

*Primary Examiner* — George Bugg
*Assistant Examiner* — Paul Obiniyi
(74) *Attorney, Agent, or Firm* — Knobbe Martens Olson & Bear LLP (57) ABSTRACT

A zone location system with ultrasound US transmitters S1, S2, S3 located in respective zones Z1, Z2, Z3 such as rooms of a building B. Preferably, the US transmitters are time-multiplexed so that each of them in turn transmits a US signal US with a unique ID code USID represented therein. The portable tag PT includes an ultrasound receiver USR arranged to receive the US signal. Based on the received US signal, the portable tag PT measures a strength of the received US signal. The portable tag PT also measures a parameter related to a movement of the portable tag PT, e.g. a Doppler shift based on the received US signal. Further, the portable tag extracts the USID. Then it transmits a wireless Radio Frequency signal RFS with its own ID PTID, the USID and first and second data values D1, D2 representing the signal strength and the movement related parameters. A processor P connected to a Radio Frequency receiver RFR receives the data from the portable tag PT and determines a connection between PTID and the zone Z2 in which it is present based on the USID. Further, the processor utilizes data D1 and D2 to calculate an estimated position POS within the zone Z2. Especially, estimated distance between US transmitter S2 and portable tag PT and velocity of the portable tag may be estimated based on D1 and D2, thus assisting in estimating the position POS of the portable tag PT. The system may further be combined with a Radio Frequency based positioning system, e.g. an RF signal strength based system, thereby enhancing the resolution of the estimated position POS of the portable tag PT. Further, such combined system help location in complicated and changing environments and in situations where the portable tag PT may be out of reach for US signals, e.g. when attached to a paper file enclosed in a box.

24 Claims, 3 Drawing Sheets

(56) References Cited

U.S. PATENT DOCUMENTS

| | | | |
|---|---|---|---|
| 5,119,104 A * | 6/1992 | Heller | 342/450 |
| 5,268,734 A * | 12/1993 | Parker et al. | 356/139.06 |
| 5,495,427 A * | 2/1996 | Puma et al. | 367/117 |
| 5,528,232 A * | 6/1996 | Verma et al. | 340/8.1 |
| 5,529,073 A * | 6/1996 | Kielbasiewicz | 600/509 |
| 5,723,911 A * | 3/1998 | Glehr | 340/10.5 |
| 5,872,516 A * | 2/1999 | Bonge, Jr. | 340/573.3 |
| 5,873,040 A * | 2/1999 | Dunn et al. | 455/456.2 |
| 5,920,287 A * | 7/1999 | Belcher et al. | 342/450 |
| RE36,791 E * | 7/2000 | Heller | 342/450 |
| 6,121,926 A * | 9/2000 | Belcher et al. | 342/450 |
| 6,141,293 A * | 10/2000 | Amorai-Moriya et al. | 367/127 |
| 6,196,973 B1 * | 3/2001 | Lazenby et al. | 600/458 |
| 6,317,386 B1 * | 11/2001 | Ward | 367/127 |
| 6,348,856 B1 * | 2/2002 | Jones et al. | 340/10.1 |
| 6,459,371 B1 * | 10/2002 | Pike | 340/539.1 |
| 6,553,013 B1 * | 4/2003 | Jones et al. | 370/328 |
| 6,680,876 B2 * | 1/2004 | Isomichi et al. | 367/128 |
| 6,710,719 B1 * | 3/2004 | Jones et al. | 340/8.1 |
| 6,720,876 B1 * | 4/2004 | Burgess | 340/568.1 |
| 6,894,612 B2 * | 5/2005 | Xydis | 340/539.11 |
| 6,970,097 B2 * | 11/2005 | Welles et al. | 340/8.1 |
| 6,995,654 B2 * | 2/2006 | Nysen | 340/7.1 |
| 7,010,369 B2 * | 3/2006 | Borders et al. | 700/90 |
| 7,012,521 B2 * | 3/2006 | Fardin et al. | 340/539.13 |
| 7,152,791 B2 * | 12/2006 | Chappidi et al. | 235/385 |
| 7,171,329 B2 * | 1/2007 | Rodman et al. | 702/150 |
| 7,283,423 B2 * | 10/2007 | Holm et al. | 367/99 |
| 7,333,018 B2 * | 2/2008 | Singh et al. | 340/572.4 |
| 7,352,652 B2 * | 4/2008 | Holm et al. | 367/128 |
| 7,362,258 B2 * | 4/2008 | Kawabe et al. | 342/44 |
| 7,362,656 B2 * | 4/2008 | Holm | 367/128 |
| 7,403,111 B2 * | 7/2008 | Tessier et al. | 340/539.13 |
| 7,535,796 B2 * | 5/2009 | Holm et al. | 367/100 |
| 7,549,960 B2 * | 6/2009 | Govari | 600/437 |
| 7,575,550 B1 * | 8/2009 | Govari | 600/437 |
| 7,646,330 B2 * | 1/2010 | Karr | 342/44 |
| 7,671,718 B2 * | 3/2010 | Turner et al. | 340/5.61 |
| 7,692,530 B2 * | 4/2010 | Turner et al. | 340/5.61 |
| 7,710,829 B2 * | 5/2010 | Wei et al. | 367/128 |
| 7,714,728 B2 * | 5/2010 | Koblasz | 340/573.1 |
| 7,785,259 B2 * | 8/2010 | Zheng et al. | 600/438 |
| RE41,629 E * | 9/2010 | Bonge, Jr. | 340/573.3 |
| 7,864,633 B2 * | 1/2011 | Holm et al. | 367/124 |
| 7,911,324 B2 * | 3/2011 | Breed et al. | 340/10.1 |
| 7,916,577 B2 * | 3/2011 | Jeong et al. | 367/128 |
| 7,982,601 B2 * | 7/2011 | Corrado et al. | 340/539.22 |
| 8,013,735 B2 * | 9/2011 | Arpin et al. | 340/539.13 |
| 8,026,821 B2 * | 9/2011 | Reeder et al. | 340/573.1 |
| 8,035,508 B2 * | 10/2011 | Breed | 340/539.11 |
| 8,054,160 B2 * | 11/2011 | Corrado et al. | 340/10.1 |
| 8,089,827 B2 * | 1/2012 | Carotenuto | 367/128 |
| 8,164,439 B2 * | 4/2012 | Dempsey et al. | 340/539.12 |
| 8,190,730 B2 * | 5/2012 | Dempsey | 709/224 |
| 8,203,910 B2 * | 6/2012 | Zhao et al. | 367/127 |
| 8,212,653 B1 * | 7/2012 | Goldstein et al. | 340/10.1 |
| 8,258,965 B2 * | 9/2012 | Reeder et al. | 340/573.1 |
| 2002/0075152 A1 * | 6/2002 | Nysen | 340/573.1 |
| 2002/0133076 A1 * | 9/2002 | Amemiya | 600/453 |
| 2002/0167417 A1 * | 11/2002 | Welles et al. | 340/825.49 |
| 2003/0058098 A1 * | 3/2003 | Sebanc et al. | 340/539 |
| 2004/0034306 A1 * | 2/2004 | Seward | 600/459 |
| 2005/0035862 A1 * | 2/2005 | Wildman et al. | 340/573.1 |
| 2005/0140508 A1 * | 6/2005 | Tessier et al. | 340/539.13 |
| 2006/0077759 A1 * | 4/2006 | Holm | 367/128 |
| 2007/0115137 A1 * | 5/2007 | Lyon et al. | 340/825.49 |
| 2008/0033752 A1 * | 2/2008 | Rodgers | 705/2 |
| 2008/0061967 A1 * | 3/2008 | Corrado | 340/539.26 |
| 2008/0108372 A1 * | 5/2008 | Breed | 455/456.1 |
| 2008/0180218 A1 * | 7/2008 | Flax | 340/10.1 |
| 2009/0273465 A1 * | 11/2009 | Shamir et al. | 340/539.1 |
| 2009/0315735 A1 * | 12/2009 | Bhavani et al. | 340/825.49 |
| 2010/0109849 A1 * | 5/2010 | Wang et al. | 340/10.5 |
| 2010/0141435 A1 * | 6/2010 | Breed | 340/539.13 |
| 2010/0283626 A1 * | 11/2010 | Breed | 340/825.49 |

FOREIGN PATENT DOCUMENTS

| | | | | |
|---|---|---|---|---|
| WO | WO 01/15070 A2 | | 3/2001 | |
| WO | WO 2004/051303 A1 | | 6/2004 | |
| WO | WO 2007/110626 | | 10/2007 | |
| WO | WO 2007110626 A2 * | | 10/2007 | G01S 5/30 |

OTHER PUBLICATIONS

Wax, David W. "MFSK—The Basis for Robust Acoustical Communications" Honeywell Marine Systems Operations, 1981, pp. 61-66.

G. Borriello, A. Liu, T. Offer, C. Palistrant and R. Sharp. "WALRUS: Wireless Acoustic Location with Room-Level Resolution using Ultrasound." Proc. 3rd Int. Conf. on Mobile Systems, Applications, and Services (Seattle, WA, Jun. 25, 2005). ACM, New York, NY.

Scussel, K. F.; Rice, J. A.; Merriam, S., "A new MFSK acoustic modem for operation in adverse underwater channels," OCEANS '97. MTS/IEEE Conference Proceedings, vol. I , pp. 247-254, Oct. 6-9, 1997.

Wax, D., "MFSK—The Basis for Robust Acoustical Communications," OCEANS, vol. 13, No., pp. 61-66, Sep. 1981.

* cited by examiner

ULTRASOUND ZONE LOCATION SYSTEM WITH HIGH CAPACITY

CROSS REFERENCE TO RELATED APPLICATIONS

This application claims the benefit and priority to and is a U.S. National Phase Application of PCT International Application Number PCT/EP2008/065386, filed on Nov. 12, 2008, designating the United States of America and published in the English language, which is an International Application of and claims the benefit of priority to European Patent Application No. 07120535.5, filed on Nov. 13, 2007, and European Patent Application No. 08159582.9, filed on Jul. 3, 2008. The disclosures of the above-referenced applications are hereby expressly incorporated by reference in their entireties.

FIELD OF THE INVENTION

The present invention relates to the field of positioning or location systems, especially the invention related to the field of ultrasound-based zone location systems. More specifically, the invention provides a high capacity ultrasound zone location system assisted by radio frequency communication.

BACKGROUND OF THE INVENTION

A large variety of positioning or location systems capable of tracking persons or mobile objects in real-time, e.g. within a work place or a factory exist. Such systems determine a position of a portable tag attached to the person or object by establishing a communication between the portable tag and one or more stationary US stations. Many different methods and types of signals have been suggested for such systems.

Radio Frequency (RF) signals can be used to determine the position of the portable tag, e.g. by calculating the geometric position of the portable tag based on triangulation, i.e. based on sensing phase differences in an RF signal from the portable tag received at three stationary RF stations. Alternatively RF systems may estimate position based on amplitude of the RF signal. Such systems only require rather few RF stations, since RF signals can cover a large area, since such signals easily penetrate building elements etc. However, for zone location applications, RF signals are less suited, since the geometric position of the portable tag must be determined rather precisely e.g. to be able to determine in which of two neighbouring rooms the portable tag is present. An error of 30-40 cm is enough to make confusion between such two rooms, if a tag is positioned close to the wall separating the two rooms.

Infrared signals (IR) have also been suggested for positioning systems. Such systems are suited for zone location, since IR signal radiation is naturally limited by floor, walls and ceiling of a room. However, in practice IR sensing is vulnerable and requires many sensors to cover one zone, since IR signal communication is easily hindered if there is not a clear line-of-sight between transmitter and receiver, e.g. a thin curtain may be provide enough obstacle effect to destroy IR communication.

Ultrasound (US) signals are suited for zone location system due to the inherent property that US signal radiation is limited by floor, walls and ceiling of a room, thus providing automatically an intuitive split into zones. Compared to IR signals, US signals are less vulnerable to obstacle effects, since many obstacles will provide acoustic reflections of US signals, thus serving to provide an acceptable US connection between a receiver and a transmitter even if there is no clear line-of-sight. However, compared to RF signals, location determination by means of US signals requires US stations positioned in all zones, and in zones defined as one large room or two or more interconnected rooms, even more US stations are required per zone. Further, location systems based on US signals have a rather poor capacity. This is due to the fact that US signals travel at the speed of sound which is much slower than RF waves, and further, the bandwidth of US waves is limited compared to RF signals. As a consequence, the required US signals have a considerable longer temporal extension, such that determination of location of one single portable tag may take one second or more. This is too long for the systems to function properly e.g. if 20 or 30 tags are located in one zone at the same time.

Location systems utilizing a combination of US and RF signals have been suggested. The somewhat limited spatial coverage of US based systems have been overcome by providing a US location method which is supplemented by an RF location method to be used in cases where the US location method fails due to a limited spatial range, e.g. where a person wearing a tag has moved outside the predetermined zones.

US 2005/0140508 A1 discloses a location system adapted to receive an RF signal and an IR or US signal associated with each other, thereby allowing unique data regarding both signals to be provided in just the RF signal, thereby saving power for sending IR or US signals.

US 2006/0077759 A1, by the inventor of the present invention, discloses an US location system in which identification tags are equipped with an US receiver and an RF transmitter. The identification tags receive an US signal whose arrival time they measure. This arrival time together with an identification code is sent by the tag in an RF signal to a central unit which then calculates the position of the identification tag. Battery life of the tag is improved, since it does not need to send US signals but only an RF signals which are less power consuming. However, the US arrival time measurement is complex and noise-sensitive, and thus in practice often reduces range to less than desired Therefore, the robustness and usefulness of such a system is rather limited.

WO 2007/110626 describes a method for determining a 3D position of a mobile component relative to a fixed component. The fixed component has a plurality of fixed US transducers in a spaced-apart arrangement and an RF transducer. The mobile component has an US transducer and an RF transducer. The fixed component sends an RF trigger signal, causing the mobile component to send a US signal and resetting timers associated with each of the fixed US transducers. US arrival times at each of the plurality of fixed US transducers are then detected, and trigonometric calculations are used to determine the 3D position of the mobile component. Such system is capable of high precision 3D positioning, but for zone location purposes the distance range and capacity is far too limited. Further, the mobile component requires a power consuming US transmitter.

The paper "WALRUS: Wireless Acoustic Location with Room-Level Resolution using Ultrasound" by G. Borriello, A. Liu, T. Offer, C. Palistrant and R. Sharp, in Proc. 3rd Int. Conf. on Mobile Systems, Applications, and Services (Seattle, Wash., June, 2005). ACM, New York, N.Y., describes an US based location system suited to determine in which room a mobile unit is present. The mobile unit transmits an RF signal to a central station.

US 2002/0167417 A1 describes a zone location system where one US transmitter is placed in each zone and transmits a unique code in the US signal, thus identifying the zone by US. A portable tag receives the US signals and transmits in an RF signal the unique code identifying the zone together with its own identification code.

However, both of the systems described in the "WALRUS" paper and in US 2002/0167417 A1 suffer from a rather coarse location precision which is inconvenient for covering large rooms or rooms with complicated geometry.

SUMMARY OF THE INVENTION

Thus, according to the above description, it is an object of the present invention to provide a simple zone location system which is capable of functioning reliably with rather few components, and which is able to handle real-time zone location of many tags with a high location precision and still with a low power consumption in the portable tag.

In a first aspect, the invention provides a zone location system arranged to determine in which zone of a predetermined set of zones, such as rooms, a portable tag is present, the system including
- a set of ultrasound transmitters located in respective zones of the predetermined set of zones, wherein the ultrasound transmitters are arranged to generate an ultrasound signal, such as an ultrasound burst signal,
- a portable tag with an associated identification code, the portable tag including
  - an ultrasound receiver arranged to receive the ultrasound signal,
  - signal processing means arranged to
    - measure a strength of the received ultrasound signal and to generate a first data value accordingly, and
    - measure a parameter related to a movement of the portable tag, such as a Doppler shift based on the received ultrasound signal, and to generate a second data value accordingly, and
  - a Radio Frequency transmitter arranged to transmit a Radio Frequency signal with data representing the identification code, and the first and second data values,
- a Radio Frequency station arranged to receive the Radio Frequency signal from the portable tag, and
- a processor operationally connected to the Radio Frequency station, the processor being arranged to
  - identify the portable tag based on the identification code,
  - determine in which zone the portable tag is present, based on detecting which of the set of ultrasound stations being capable of establishing a communication with the portable tag on the ultrasound channel, and
  - determine a position within said zone, based on the first and second data values, such as by comparing the first and second data values with previously stored data values.

By 'RF' is understood a wireless electromagnetic communication. Thus, RF includes any known type of wireless RF communication, such as in one of the ISM bands, ZigBee, Bluetooth, IEEE 802.11 (WLAN), or communication using Ultra Wide Band (UWB). By 'RF station' is understood a device including at least one RF antenna connected to an electric RF receiver circuit. E.g. the RF station may include one single box with RF receiver and possibly also RF transmitter circuits which are then connected to several spatially distributed antennas to cover a wider range.

By 'US' is understood sound with an ultrasonic frequency, i.e. in the frequency range above 20 kHz, such as the frequency range 20-100 kHz.

By 'processor' is understood a device dedicated to controlling the zone location process. The processor may be a general purpose computer with appropriate software dedicated to the specific type of location embodiment, or the processor may be a dedicated device. Optionally the processor is connected to a network allowing distributed users to access location information provided by the processor.

Such zone location system has the general advantages of ultrasound based location systems, namely that it is well-suited for applications where the predetermined set of zones corresponds to rooms of a building. The task of determining in which zone the portable tag is present is rather simple e.g. if only one US station is installed in each zone, because then the portable tag is present in the zone where the US station can communicate with the portable tag on the US channel. Due to the wide range of the RF signals, and due to the fact that RF signals are not directly involved in the location process, only one single centrally positioned RF receiver is required for many applications, since such single RF receiver can often cover a whole building complex. Thus, in conclusion the basic system is rather simple to implement.

By means of the first and second data values transmitted via RF from the portable tag (e.g. Doppler shift data and a signal strength indicator (SSI)), the processor can determine a position within the zone, and thus more precisely determine where the portable tag is within the zone—still only with the use of a single US transmitter per zone. Furthermore, the frequency related parameter, e.g. Doppler shift data, can be used to determine if the portable tag is moving and even in which direction the tag moves.

The portable tag can be made rather simple and power efficient, since it does not need a power consuming US transmitter, only a US receiver, and the US communication is a one-to-many, thereby providing a high capacity. Furthermore, by transmitting an RF signal from the portable tag with its identification code, system capacity is increased, since the high speed of the RF signals from the tag to the RF station, enables a fast identification of the tag. Altogether, the system according to the first aspect is well-suited for multiple access applications requiring a high ultrasound channel capacity, such as for real-time tracking of many portable tags present in the same zone.

US signals transmitted by the US transmitters may be US bursts modulated with data, wherein the US burst has a duration being in the range from 1 ms to 300 ms. The duration range may be such as 10-250 ms, or such as 50-150 ms. The data preferably includes a unique code identifying the US transmitter and thus identifies the zone in which the US transmitter is located. By receiving a code identifying the US transmitter, the portable tag already knows which zone it is in, and it can include this information (or another code representing this information) in addition to its own identification code in the RF signal, thus providing a de-centralized location which is then provided to the processor in an RF signal, whereby the processor determines in which zone the portable tag is present.

The portable tag may also include an RF receiver arranged to receive an RF signal from an external RF transmitter. Especially, the portable tag may be arranged to receive a request for location in said RF signal from the RF transmitter. Thereby, the portable tag may save power by having its US receiver switched off and then activating the US receiver in response to said request for location.

In preferred embodiments, the RF receiver and the US transmitters are stationary components.

The processor may be arranged to determine a distance between the ultrasound transmitter and the portable tag based on the first data value, and to accordingly determine said position within said zone. This distance may be determined by means of comparing the signal strength measured by the portable tag with predetermined stored values thus enabling a simple conversion of a signal strength indicator and a distance.

The processor may be arranged to determine a relative movement, such as a velocity, between the portable tag and the ultrasound transmitter (based on the second data value), and to accordingly determine said position within said zone. Especially, the relative movement may be based on a Doppler shift determined in the portable tag. Hereby it is possible to determine the position of the portable tag based on the history of Doppler shift values and even to predict a future location of the portable tag. In preferred embodiments, the portable tag is arranged to measure a Doppler shift based on the received ultrasound signal and generate the second data value accordingly. Such embodiments enable estimation of movement of the portable tag, e.g. velocity, based on a simple method utilizing the US receiver already present in the portable tag, and thus such embodiment is preferred over standard ways of estimating movement, e.g. using an accelerometer in the portable tag.

Especially, the first and second data values received by a portable tag may be stored by the processor to create a history and thus enable a tracking of the portable tag, thereby enabling a location of the portable tag, also in case US access fails at the moment location is requested.

The processor may be connected to the RF receiver by means of wireless RF connection. The processor may be connected to the US transmitters, e.g. by wireless RF connections in some embodiment, while in other embodiments of the system, the US transmitters are stand-alone units without any connection to the processor. In the last mentioned embodiment, the US transmitters may continuously transmit US signals, e.g. with a unique identification code represented therein, while in embodiments with operational connection between the processor and the US transmitters, the processor may be arranged to remotely activate the US transmitters, e.g. by individually activating each US transmitter.

At least first and second spatially separated US transmitters may be located in at least one of the predetermined set of zones, wherein the portable tag is arranged to receive a first US signal from the first US transmitter and a second US signal from the second US transmitter. By using two or more US transmitters in each zone, location reliability is enhanced, since the probability of the US communication failing is reduced. The US transmitters may be time-multiplexed on the same frequencies, e.g. transmitting every other time, thus allowing easy discrimination by the respective US signals when received by the portable tag. The portable tag may perform separate measurements of respective first and second signal strengths of the first and second US signals. This will enable further position measures to increase position precision.

If desired, the zone location system may be supplemented by an RF location possibility, e.g. to assist the US based zone location system in cases where no US connection to the portable tag can be established. Such RF location possibility can be implemented such as known in the art, and described in the foregoing chapter. Such auxiliary location method may be used e.g. if an object such as a paper file with a portable tag attached thereto is placed inside a closed box or the like, where US signals can not penetrate. In such cases RF location methods may still be able to localize the object. Further, RF location can be used to enhance location precision by supplementing the position within a zone as determined based on the US communication between US transmitter(s) and portable tag.

The location system of the first aspect may be used for real-time location of persons and/or objects. For location of persons, the portable tag can be implemented as a small device, e.g. a pen-like device suited for position in a person's pocket.

A second aspect of the invention provides a method for determining in which zone of a predetermined set of zones a portable tag is present, the method including
- transmitting an ultrasound signal on an ultrasound channel from a set of ultrasound stations of which at least one is positioned in each of the predetermined set of zones,
- receiving the ultrasound signal in the portable tag,
- determining a strength of the received ultrasound signal, and generating a first data value accordingly,
- determining a parameter related to a movement of the portable tag, such as a Doppler shift based on the received ultrasound signal, and generating a second data value accordingly,
- transmitting from the portable tag a Radio Frequency signal including a code identifying the portable tag, and the first and second data values,
- receiving the RF signal from the portable tag,
- identifying the portable tag based on the identification code,
- determining in which zone the portable tag is present by detecting which of the set of ultrasound stations being capable of establishing a communication with the portable tag on the ultrasound channel, and
- determining a position within said zone, based on the first and second data values.

It is appreciated that the same advantages and embodiments described for the first aspect apply as well for the second aspect. Further, it is appreciated that the described embodiments can be mixed two, three or more in any way.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF AN EMBODIMENT

Figure 1:
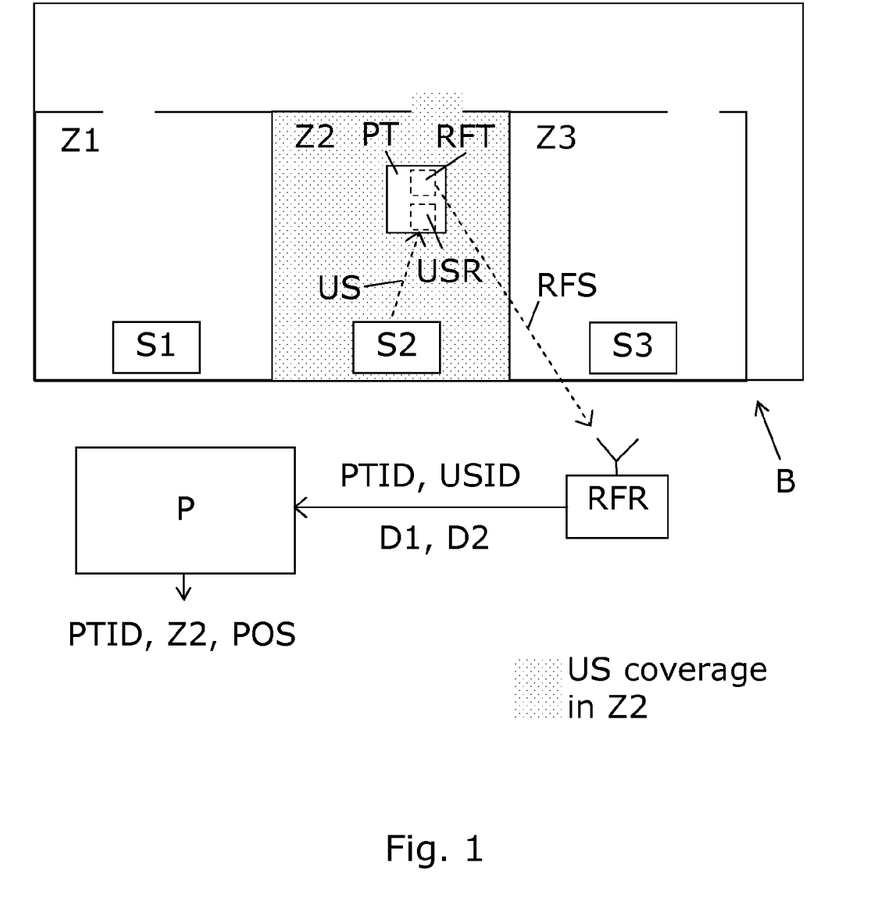
FIG. 1 illustrates an overall sketch of a zone location system embodiment according to the invention.

FIG. 1 shows an overall sketch serving to illustrate basic components of a rather simple embodiment of the zone location system according to the invention. A portable tag PT includes an RF transmitter RFT and a US receiver. The shown embodiment is arranged to locate in which of the zones Z1, Z2, Z3 the portable tag PT is present, the zones Z1, Z2, Z3 corresponding to rooms of a building B. US transmitters S1, S2, S3 are installed in the respective zones Z1, Z2, Z3 and transmit US signals indicated as 'US', and this US signal includes an ID code USID identifying the US transmitter. In the illustrated example, only US transmitter S2 is capable of providing US communication with the portable tag PT, and thus the portable tag PT receives the US signal US from the US transmitter S2 and its ID code USID. The portable tag PT transmits from its RF transmitter RFT an RF signal RFS with the USID and its own ID code PTID. Further the RF signal RFS includes first and second data values D1, D2 based on respective measured parameters on the US signal: a signal strength indicator (SSI) and a Doppler shift frequency indicator.

In FIG. 1, the portable tag PT is located in zone Z2, and the dotted area indicates US coverage of US station U2 placed in Z2. Thus, since Z2 is a room with walls, floor and ceiling, US waves generated in Z2, either by the portable tag PT or by the US station U2, will not be able to propagate outside the zone Z2 (at least not without significant attenuation). Therefore, the location of the portable tag PT can be determined solely by checking which ones of the US stations are capable of coming into US contact with the portable tag PT.

The processor P receives via the RF receiver RFR the data PTID, USID, D1 and D2 from the portable tag PT. Based on the USID of the US transmitter S2, the processor P can determine that the portable tag PT is located in zone Z2, and combined with PTID, the portable tag PT is located.

Further, the processor P calculates a position POS within the zone Z2 based on the data values D1 and D2. By combination of signal strength based and frequency based parameters derived from the received US signal US, a rather reliable position POS within the zone Z2 may be obtained.

The D1 data generated by the portable tag PT, e.g. in the form of a Received Signal Strength Indicator (RSSI), may be estimated in standard ways that are common to use in Automatic Gain Control circuits that help prevent saturation of A/D-converters. With only a single US transmitter in a zone (e.g. room), it is possible to get an estimate of distance between tag PT and US transmitter. With proper placement of the US transmitter, e.g. furthest away form an entrance door of a room, this may provide a reliable estimate. With two or more US transmitters in a zone, the portable tag PT can make a measurement of RSSI from each of them to further refine the position estimate. RSSI values may also be compared to a pre-recorded 'map' of RSSI values for many locations in the room. The present value and its time history is then compared to the 'map' and the most likely location is determined. This is analogous to fingerprinting based on radio RSSI in active RFID system. To even further refine the position estimate, RF based RSSI values may be estimated by the tag, and thus RSSI values from two completely different modalities (RF and US) may be combined. In this way a more accurate position estimate can be obtained which exceeds the accuracy of either one of them alone. Thus there is a potential for getting better results than the 3 meter median error which is often quoted.

The D2 data can be based on a measured Doppler shift, which can be determined with a fairly high accuracy. The Doppler shift in Hz is: $fd=f0*v*\cos \theta /c$, where $\theta$ is the angle between the line connecting the US transmitter and the portable tag PT and the movement vector, v is the velocity, c is the speed of sound, and f0 is the center frequency of the US signal. Thus a moving target will generate a Doppler shift which is different from a stationary one, and the direction of movement can also be assessed. This aids in refining the position estimate POS within the zone, and in particular the processor P may further include an algorithm based on models for object behavior to further utilize the frequency related data D2. The estimation of Doppler is rather simple, and further described in for underwater communications, e.g. in [Wax, D., "MFSK—The Basis for Robust Acoustical Communications," OCEANS, vol. 13, no., pp. 61-66, September 1981], and FIG. 4 in [Scussel, K. F.; Rice, J. A.; Merriam, S., "A new MFSK acoustic modem for operation in adverse underwater channels," OCEANS '97. MTS/IEEE Conference Proceedings, vol. 1, pp. 247-254, 6-9 October 1997]. Since the algorithms are rather simple, it is possible to perform the calculation either in the portable tag PT or in the processor P based on rather raw data D2 from the portable tag PT.

The quality of a Doppler shift estimate depends on the kind of relative movement between the transmitter and receiver. The highest quality is if the relative velocity component is constant, i.e. constant $v*\cos \theta$. In this case the estimated Doppler shift per symbol is the same and the Doppler spread (maximum Doppler shift–minimum Doppler shift) is small or zero. If the movement is more complex, e.g. a rotation so that $\theta$ varies during the transmission, the Doppler spread will be large, indicating that the usefulness of the Doppler shift estimate is smaller. Therefore the Doppler shift is preferably accompanied by a Doppler shift quality measure, such as the Doppler spread.

One of or both of the first and second data values D1, D2 may be stored by the processor P to allow a temporal tracking of position of the portable tag PT which may further increase reliability and precision of the determined position POS within the zone.

Figure 2:
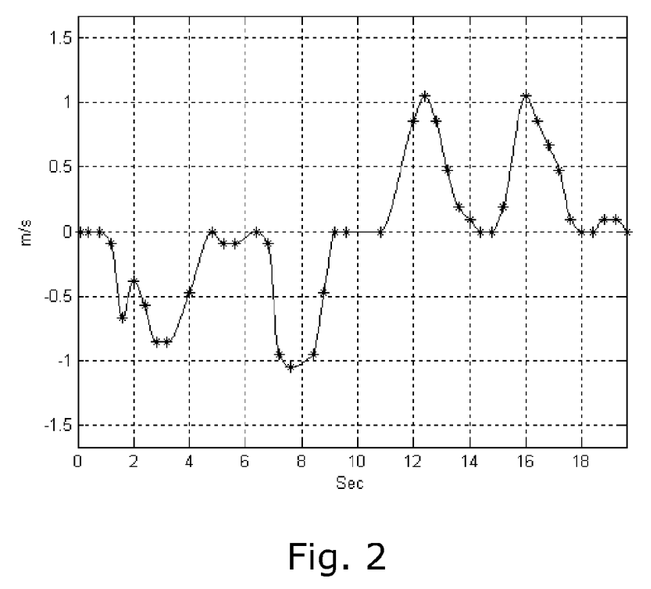
FIG. 2 illustrates an example of velocity data based on Doppler shift data received in the second data value from the portable tag.

FIG. 2 illustrates an example of such time history of Doppler shift based data indicating a velocity component along an axis between US transmitter and portable tag PT. It shows a portable tag PT which first moves away from the US transmitter (1-9 seconds) and then approaches it again (11-18 seconds). By integrating the velocity [m/s] plotted versus time [second] in the graph of FIG. 2, a corresponding measure of distance between US transmitter and portable tag PT can be estimated, thereby providing data related to the position within the zone.

The processor P preferably has a user interface allowing users to access location data, either using a graphic output providing an overview of all zones or a selection of some of all zones, and/or by means of receiving a user input in the form of a request for location of a specific person or object, to which the processor may respond either with a text output and/or audible output. The processor may, in larger systems, be connected to a network such as an internal computer network of a company, so as to allow users of the network to access zone location information, either for tracking persons or objects.

Figure 3:
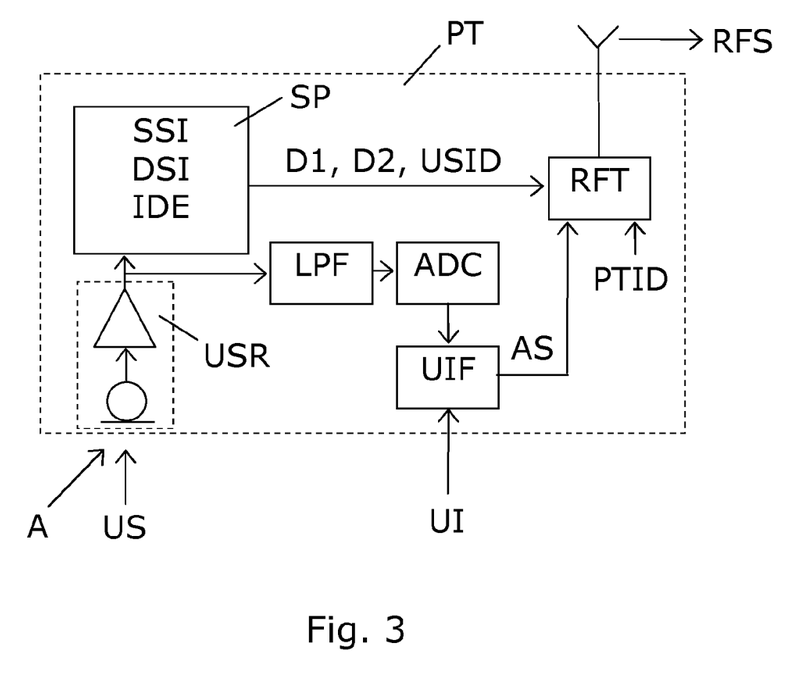
FIG. 3 illustrates components of a portable tag embodiment.

FIG. 3 illustrates components of a preferred portable tag PT. A US receiver USR includes a microphone and pre-amplifier arranged to receive US and as well as audio frequency sound A, thereby utilizing one microphone and pre-amplifier for US location purpose and audio contact with a user wearing the portable tag PT. The electric output from the US receiver USR is applied to a signal processor system SP that converts the electric signal to a digital representation and measures a sequence of a received US signal. Based on the received US sequence, the signal processor system SP then calculates a signal strength indicator SSI, a Doppler shift indicator DSI, and extracts an identification code IDE according to a predetermined US transmitter ID code represented in the US signal. The SSI and DSI can be calculated by algorithms such as explained above. The SSI, DSI, and IDE are then applied to a Radio Frequency transmitter RFT as respective first data value D1, second data value D2, and US transmitter identification USID. Further, the ID for the portable tag itself PTID is also applied to the Radio Frequency transmitter RFT, and it transmit a Radio Frequency signal RFS with these data represented therein.

In the illustrated embodiment, the portable tag PT is arranged to receive a user input UI by a user interface, e.g. in the form of an alert button placed on an accessible part of the portable tag casing. Upon activation by the user, the user interface UIF allows an electric audio signal AS to be applied to the Radio Frequency transmitter RFT and included in the transmitted Radio Frequency signal RFS, e.g. together with an alarm code that allows a receiver to take appropriate action. Using the microphone of the US receiver USR, the user's voice is transmitted in the Radio Frequency signal RFS, thus allowing the user to give a message e.g. to a central receiver. To provide the electric audio signal AS, the electric output from the US receiver USR is low-pass filtered by low-pass filter LPF, e.g. with a cut off frequency of such as 5 kHz or 10 kHz. The low-pass filtered signal may then be analog-to-digital converted by converter ADC, and via the user interface UIF, the electric audio signal AS is then applied to the Radio Frequency transmitter RFT. It is appreciated that the components illustrated in FIG. 3 are meant to illustrate preferred functions of the portable tag PT rather than practical implementations, since practical circuit design for the portable tag PT can be chosen as known by the skilled person.

Figure 4:
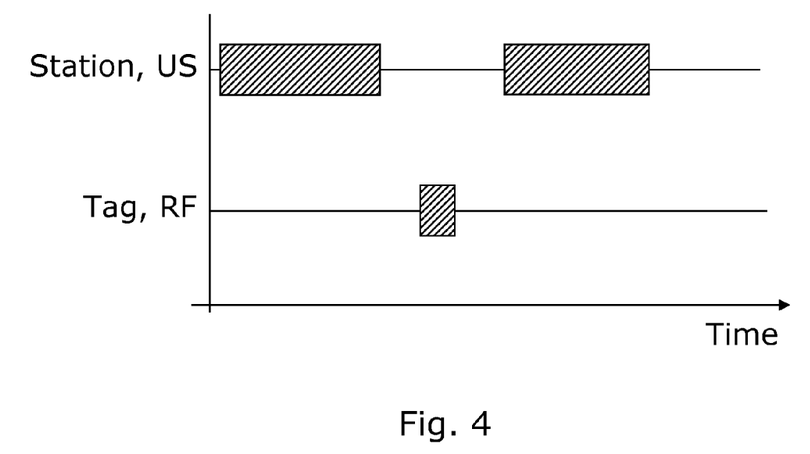
FIG. 4 illustrates US and RF signal timing for one embodiment.

FIG. 4 illustrates signal timing for an embodiment with a portable tag which only has an RF transmitter. The US transmitter transmits US signals with intermediate pauses. The tag listens, and wants to initiate a location procedure, it transmits its identification code in an RF signal. The US signal from the US transmitter may include a code identifying itself, as described. Thus, in the subsequent RF signal from the tag, the tag may include the US transmitter identification code, thereby allowing the processor to determine the location of the tag. Since the tag initiates the location procedure, the tag may be in a power saving mode with the US receiver turned off, unless it wants to initiate a location, such "waking up" being caused possibly such as also described above.

Figure 5:
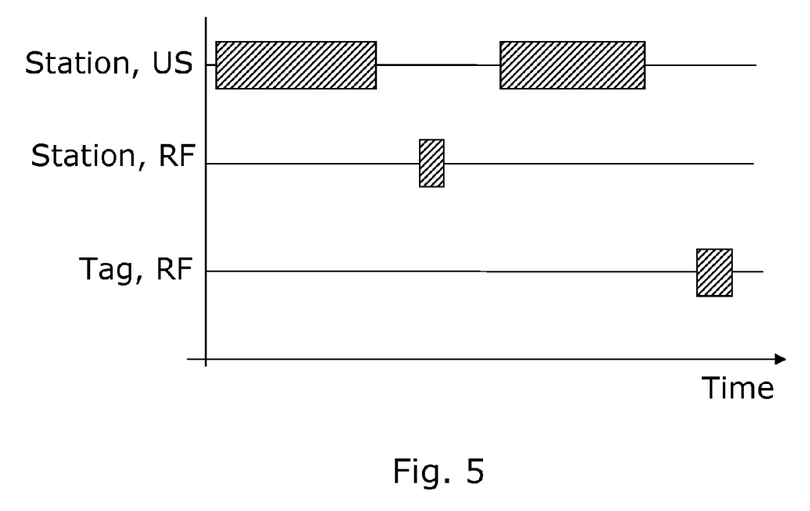
FIG. 5 illustrates US and RF signal timing for another embodiment, where the location is activated by an RF signal.

FIG. 5 illustrates the variant where the tag further has an RF receiver. The US transmitter broadcasts US signals, such as in FIG. 4. An external RF transmitter sends an RF signal requesting the specific tag to "wake up", and in response to this "wake up" RF signal, the tag can activates its US receiver, in case it is not always active, and the tag then receives the subsequent broadcast US signal and replies with transmitting an RF signal with its identification code, and possibly also with a code identifying the US transmitter.

U.S. Pat. No. 7,283,423 describes a method for reducing effects of line noise at ultrasound frequencies which may disturb US communication in a US based zone location system. Switch-mode power supplies have become common, and they often operate in the range 20-60 kHz, generating an almost sinusoidal ultrasonic noise, with fluorescent lamps and computer monitors being significant noise source in this respect. An alternative solution which can be used when the PT has an RF receiver is that the US stations also has a US receiver which constantly monitors and scans the US band. When there are no tags transmitting, the US station will characterize the background noise including lines. As part of the communications to the tag, the US station will select and inform the tag which US centre frequency it uses, thus ensuring that the tag listens in an interference-free part of the band.

US receivers can be implemented using a preamplifier, A/D-conversion and an FFT-processor as in underwater frequency shift keying (FSK) communications systems, such as outlined e.g. in FIG. 4 in [Wax, D., "MFSK—The Basis for Robust Acoustical Communications," OCEANS, vol. 13, no., pp. 61-66, September 1981], and FIG. 4 in [Scussel, K. F.; Rice, J. A.; Merriam, S., "A new MFSK acoustic modem for operation in adverse underwater channels," OCEANS '97. MTS/IEEE Conference Proceedings, vol. 1, pp. 247-254, 6-9 October 1997].

An alternative is to use a digitally controlled phase-locked loop (PLL). The digital control enables a micro controller to set/change the centre frequency of the PLL. The micro controller will control the PLL and ensure that Doppler shifts are tracked and data properly demodulated.

With respect to specific choice of RF and US communication channels, and specific implementation of portable tag, US stations, RF station, and processor, these are tasks which can easily be solved by the skilled person based on the above description.

To sum up, the invention provides a zone location system with ultrasound US transmitters S1, S2, S3 located in respective zones Z1, Z2, Z3 such as rooms of a building B. Preferably, the US transmitters transmit a US signal US with a unique ID code USID represented therein. The portable tag PT includes an ultrasound receiver USR arranged to receive the US signal. Based on the received US signal, the portable tag PT measures a strength of the received US signal. The portable tag also measures a parameter related to a movement of the portable tag PT, e.g. a Doppler shift based on the received US signal. Further, the portable tag PT extracts the USID. Then it transmits a wireless Radio Frequency signal RFS with its own ID PTID, the USID and first and second data values representing the signal strength and the movement related parameters. A processor P connected to a Radio Frequency receiver RFR receives the data from the portable tag PT and determines a connection between PTID and the zone Z2 in which it is present based on the USID. Further, the processor utilizes data D1 and D2 to calculate an estimated position POS within the zone Z2. Especially, estimated distance between US transmitter S2 and portable tag PT and velocity of the portable tag may be estimated based on D1 and D2, thus assisting in estimating the position POS of the portable tag PT. The system may further be combined with a Radio Frequency based positioning system, e.g. an RF signal strength based system, thereby enhancing the resolution of the estimated position POS of the portable tag PT. Further, such combined system help location in complicated and changing environments and in situations where the portable tag PT may be out of reach for US signals, e.g. when attached to a paper file enclosed in a box.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A zone location system arranged to determine in which zone of a predetermined set of zones a portable tag is present, the system comprising:
   a set of ultrasound transmitters located in respective zones of the predetermined set of zones, wherein the ultrasound transmitters are arranged to generate an ultrasound signal;
   a portable tag with an associated identification code, the portable tag comprising:
      an ultrasound receiver arranged to receive the ultrasound signal,
      a signal processing means arranged to:
         measure a strength of the received ultrasound signal and to generate a first data value accordingly, and
         measure a Doppler shift parameter based on the received ultrasound signal, and generate a second data value accordingly; and
      a Radio Frequency transmitter arranged to transmit a Radio Frequency signal with data representing the identification code, and the first and second data values;
   a Radio Frequency station arranged to receive the Radio Frequency signal from the portable tag; and
   a processor operationally connected to the Radio Frequency station, the processor being arranged to:
      identify the portable tag based on the identification code,
      determine in which zone the portable tag is present, based on detecting which of the set of ultrasound transmitters is/are capable of establishing ultrasound communication with the portable tag,
      use the second data value to determine a relative movement between the portable tag and one of the ultrasound transmitters, and
      determine a position within said zone, based on the first data value and the determined relative movement.

2. The zone location system according to claim 1, wherein the processor is arranged to determine a distance between the ultrasound transmitter and the portable tag based on the first data value, and to determine said position within said zone based on said distance and the determined relative movement.

3. The zone location system according to claim 1, wherein the ultrasound signal transmitted from one of the ultrasound transmitters includes a code identifying said ultrasound transmitter.

4. The zone location system according to claim 3, wherein the portable tag transmits data received in the ultrasound signal in a Radio Frequency signal.

5. The zone location system according to claim 4, wherein the portable tag transmits the code identifying the ultrasound transmitter in the Radio Frequency signal, and wherein the processor determines in which zone the portable tag is present, based on the code identifying the ultrasound transmitter received in the Radio Frequency signal.

6. The zone location system according to claim 1, wherein the portable tag includes a Radio Frequency receiver arranged to receive a Radio Frequency signal from an external Radio Frequency transmitter.

7. The zone location system according to claim 6, wherein the portable tag is arranged to receive a request for location in said Radio Frequency signal from the external Radio Frequency transmitter.

8. The zone location system according to claim 7, wherein the portable tag is arranged to activate the ultrasound receiver in response to said request.

9. The zone location system according to claim 1, wherein the Radio Frequency receiver and the ultrasound transmitters are stationary components, and wherein the processor is operationally connected to the Radio Frequency receiver by means of a wireless Radio Frequency connection.

10. The zone location system according to claim 1, further comprising a plurality of portable tags each with an associated unique identification code.

11. The zone location system according to claim 1, wherein the predetermined set of zones corresponds to rooms of a building.

12. The zone location system according to claim 1, wherein at least first and second spatially separated ultrasound transmitters are located in at least one of the predetermined set of zones, and wherein the portable tag is arranged to receive a first ultrasound signal from the first ultrasound transmitter and a second ultrasound signal from the second ultrasound transmitter.

13. The zone location system according to claim 1, further comprising a Radio Frequency based positioning system so as to supplement the zone location and position determination provided by ultrasound communication.

14. The zone location system according to claim 13, further comprising one or more stationary Radio Frequency transmitters, wherein the portable tag includes a Radio Frequency receiver arranged to receive a Radio Frequency signal from at least one of the stationary Radio Frequency transmitters, and wherein the portable tag is arranged to determine at least one of: a strength of the received Radio Frequency signal, and a time of arrival of the received Radio Frequency signal.

15. The zone location system according to claim 1, wherein the portable tag comprises a microphone arranged to receive said ultrasound signal and further arranged to receive an acoustic signal at audio frequencies, and wherein the portable tag is arranged to transmit a representation of the received acoustic signal at audio frequencies in a Radio Frequency signal upon receipt of a user input.

16. A method for determining in which zone of a predetermined set of zones a portable tag is present comprising:
   transmitting an ultrasound signal on an ultrasound channel from a set of ultrasound stations of which at least one is positioned in each of the predetermined set of zones;
   receiving the ultrasound signal in the portable tag;
   determining a strength of the received ultrasound signal, and generating a first data value accordingly;
   determining a Doppler shift parameter based on the received ultrasound signal, and generating a second data value accordingly;
   transmitting from the portable tag a Radio Frequency signal including a code identifying the portable tag, and the first and second data values;
   receiving the Radio Frequency signal from the portable tag;
   identifying the portable tag based on the identification code;
   determining in which zone the portable tag is present by detecting which of the set of ultrasound stations is/are capable of establishing a communication with the portable tag on the ultrasound channel;
   using the second data value to determine a relative movement between the portable tag and one of the ultrasound transmitters; and
   determining a position within said zone, based on the first data value and the determined relative movement.

17. The method according to claim 16, wherein the portable tag is located on an object.

18. The method according to claim 16, wherein the portable tag is located on a person.

19. The zone location system according to claim 1, wherein the processor is further arranged to use a model for object behavior when using the determined relative movement to determine a position within the zone.

20. The zone location system according to claim 1, wherein the processor is further arranged to create a history of Doppler-shift data for the portable tag, and use said history to track the portable tag.

21. The zone location system according to claim 20, wherein the processor is further arranged to determine a position within said zone by integrating velocity data, derived from said history, over time.

22. The method according to claim 16, further comprising using a model for object behavior to determine a position within the zone based on the determined relative movement.

23. The method according to claim 16, further comprising creating a history of Doppler-shift data for the portable tag, and using said history to track the portable tag.

24. The method of claim 23, further comprising determining a position within said zone by integrating velocity data, derived from said history, over time.

* * * * *